United States Patent [19]

Whittecar

[11] Patent Number: 4,560,884
[45] Date of Patent: Dec. 24, 1985

[54] WAVE POWER ENERGIZER

[76] Inventor: William C. Whittecar, 3020 Crawford, Parsons, Kans. 67357

[21] Appl. No.: 57,730

[22] Filed: Jul. 16, 1979

[51] Int. Cl.⁴ ............................................. F03B 13/12
[52] U.S. Cl. ....................................... 290/42; 290/53; 417/330
[58] Field of Search ................................. 290/42, 53; 417/330–332; 60/497, 506

[56] References Cited

U.S. PATENT DOCUMENTS

| | | | |
|---|---|---|---|
| 616,467 | 12/1898 | Jones | 417/332 |
| 988,508 | 4/1911 | Reynolds | 290/42 |
| 2,848,189 | 8/1958 | Caloia | 290/53 |
| 3,970,415 | 7/1976 | Widecrantz | 290/53 |
| 4,160,624 | 7/1979 | Smith | 60/506 |

Primary Examiner—William M. Shoop, Jr.
Assistant Examiner—W. E. Duncanson, Jr.
Attorney, Agent, or Firm—Leonard Bloom

[57] ABSTRACT

A power generating apparatus utilizing wave motion which includes a float pivotally connected to the underside of a stationary platform by an elongated arm, the arm connected intermediate its end with the piston rod of a cylinder-piston assembly on the upper side of the platform. The cylinder-piston assembly is provided with oppositely disposed air inlets and compressed air outlets having check valves with the outlets connected to a storage reservoir so that each stroke of the piston resulting from the wave motion imparted to the float draws in ambient air and discharges compressed air to the reservoir.

5 Claims, 5 Drawing Figures

WAVE POWER ENERGIZER

BACKGROUND OF THE INVENTION

Prior art of which this writer is aware includes the following patents: U.S. Pat. No. 3,487,228 to Kriegel, U.S. Pat. No. 3,965,365 to Parr, U.S. Pat. No. 3,515,889 to Kammerer, U.S. Pat. No. 4,001,597 to Graff, U.S. Pat. No. 3,697,764 to Stanziola et al., U.S. Pat. No. 4,009,395 to Long et al.

It has long been recognized that the motion of waves on the surface of a body of water such as the ocean offers a potential for the generation of power, and many structures have been proposed for accomplishing this purpose. In the typical prior art structure for converting wave motion to energy, one or more floats disposed on the water surface are coupled to a power generating unit by various linkages so that the rise and fall of the float due to wave motion mechanically drives the power generating unit. Such power generating units may include a pump for pumping water, an electric power generator, a hydraulic turbine or the like.

However, one of the main drawbacks in such present day structures has been their complexity particularly with respect to the linkages by means of which the float is coupled to the power generating unit. This obviously adds considerably to the cost of such apparatus both from the standpoint of initial investment as well as for maintenance since such present day structures are subject to excessive wear and frequent breakdowns.

The extensive use of offshore drilling platforms has created a heavy demand for self-contained power generating units as a result of the difficulty of providing adequate power facilities in such remote locations. Since such platforms are characteristically located in waters where wave motion is continuous, greater attention has been focused on the readily available, free and unlimited source of energy provided by such wave motion. However, proposed structures for utilizing such wave motion have not been practical enough to persuade prospective users to take advantage of such a meritorious source of energy.

OBJECTS AND SUMMARY OF THE INVENTION

Accordingly, a primary object of this invention is to provide a new and novel power generating apparatus which utilizes the wave motion of a body of water such as the ocean.

Another object of this invention is to provide a new and novel power generating apparatus utilizing wave motion only which provides a continuous source of compressed air.

Still another object of this invention is to provide a new and novel power generating apparatus utilizing wave motion in a body of water which is particularly adaptable for use in remote locations such as an offshore drilling platform.

A still further object of this invention is to provide a new and novel power generating apparatus operated by the motion of waves which is simple and inexpensive in construction, which is capable of prolonged use without break-down and which may be used in connection with a variety of energy units such as an electric generator, a hydraulic turbine or the like.

The objects of the invention and other related objects are accomplished by the provision of a stationary platform supported over a body of water having wave motion on its surface and a buoyant member floating on the water surface which is pivotally connected by an elongated support member to the underside of the platform. Intermediate its ends, the support member is connected by means of a lost motion coupling to the lower end of the vertically extending piston rod of a cylinder-piston assembly arranged on the upper surface of the platform, the cylinder being provided with inlet and outlet openings having check valves adjacent the top and bottom of the cylinder so that the rise and fall of the waves and the concomitant movement of the buoyant member moves the piston through the rod in a reciprocating manner so that during both of the strokes of the piston, ambient air is drawn into the cylinder through the inlet openings and compressed air is discharged through the outlet openings to be conducted through a conduit connected to the outlet openings to a compressed air storage reservoir for subsequent use in an air operating power generating unit.

Other objects and advantages of the invention will become apparent in the light of the following description taken in connection with the accompanying drawings.

DESCRIPTION OF THE PREFERRED EMBODIMENT

Figure 1:
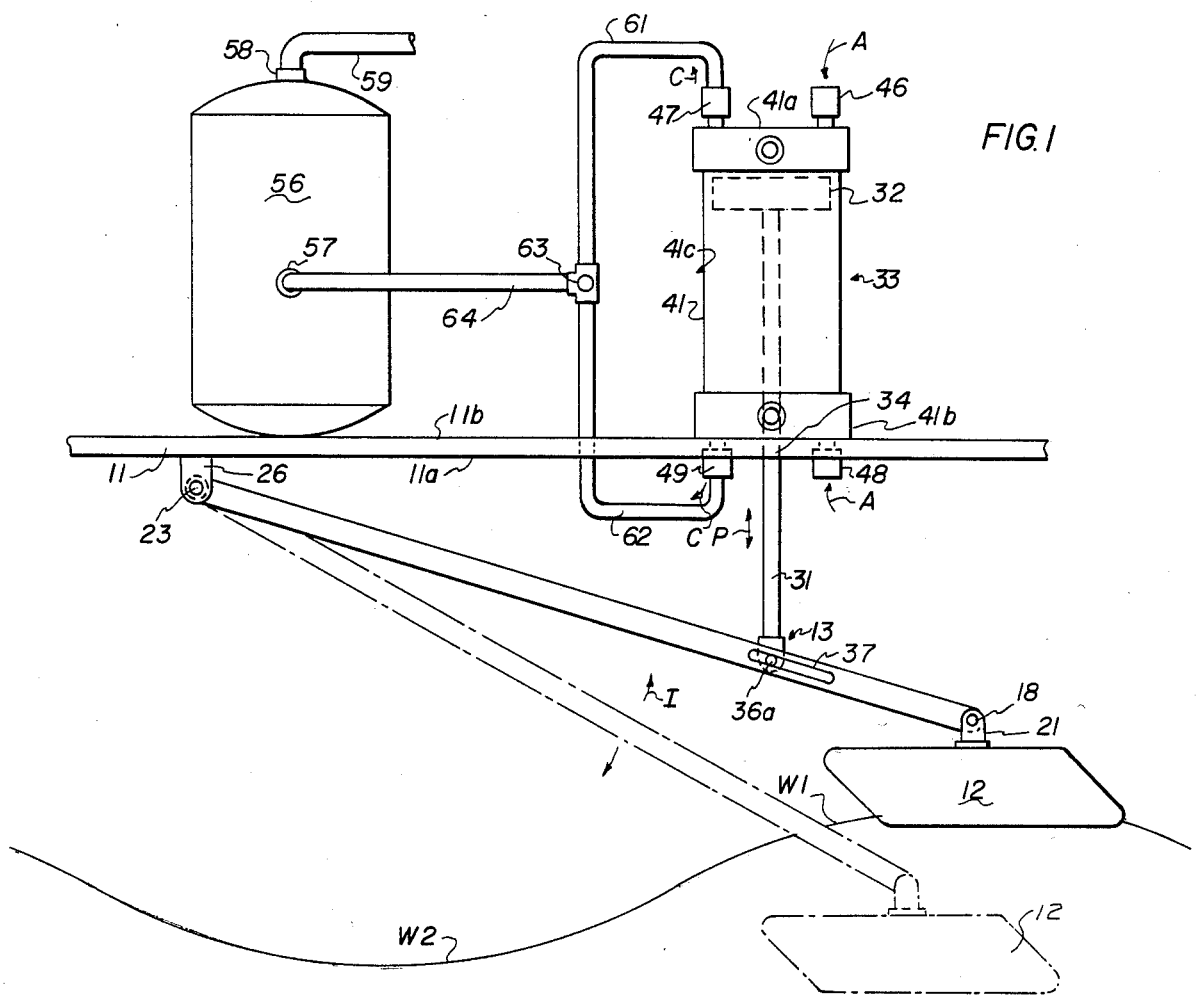
FIG. 1 is a side elevation of the power generating apparatus of the invention.

Referring now to the drawings and to FIG. 1 in particular there is shown a power generating apparatus constructed in accordance with the invention which is arranged to be installed on a stationary platform 11 located over a body of water designated generally by the letter W. The body of water W is of the type having a wave motion on its surface characterized by swells W1 and troughs W2 typical of the ocean or the like. The stationary platform 11 may be of any suitable type such as a wharf, and by way of example may be a portion of the deck of an off-shore drilling platform suitably supported in the well known manner in a remote location off-shore from land.

The apparatus of FIG. 1 includes at least one buoyant member 12 such as a hollow floatation chamber or the like which is pivotally attached by means of an elongated support member designated generally by the numeral 13 to the underside 11a of the platform 11 for reciprocating pivotal movement in the direction of the double arrow 1.

As can be understood, the buoyant member 12 as it floats on the surface of the body of water W, is moved by wave motion from the broken line position of FIG. 1 corresponding to the trough W2 of the wave and the solid line position of FIG. 1 corresponding to the crests or swells W1 sub 1 of the wave.

Figure 2:
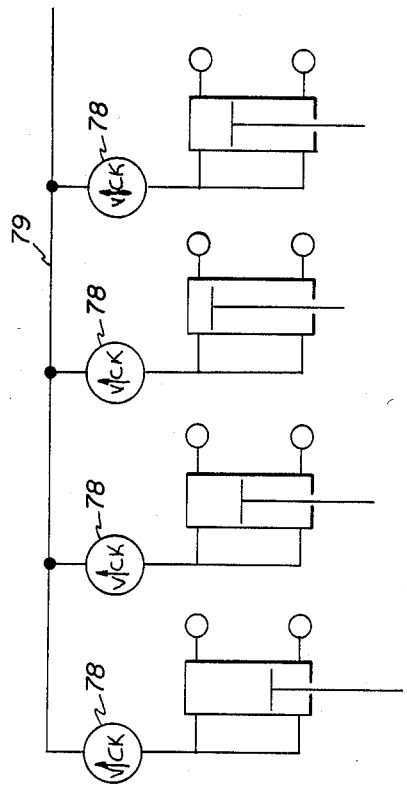
FIG. 2 is an end view of the power generating apparatus of FIG. 1.

As shown best in FIG. 2, the support member 13 comprises a pair of support arms 16, 17 arranged in spaced apart parallel relationship. The outer ends of the support arms 16, 17 are pivotally connected by means of pins 18, 19 to brackets 21, 22 suitably secured to the upper surface of the buoyant member 12. The opposite ends of the arms 16, 17 are pivotally connected by means of pins 23, 24 on brackets 26, 27 suitably mounted on the underside 11a of platform 11.

At the point intermediate the ends of the support arms 16, 17, the arms are connected by means of a lost motion coupling to a vertically extending piston rod 31 connected to the piston 32 of a cylinder and piston assembly designated generally the symbol 33 suitably mounted on the upper surface 11b of the platform 11 as shown best in FIG. 1. More specifically, the lower end of the piston rod 31 which extends through a suitably provided opening 34 in the platform 11 is secured centrally to a cross arm 36 as shown best in FIG. 2 the outer ends of which are provided with portions of reduced diameter 36a, 36b which are received in longitudinally extending slots 37, 38 in the arms 16, 17 respectively. Thus, as the buoyant member 12 moves between the dotted line and solid line position of FIG. 1, the piston rod 31 is maintained in a substantially vertical position for reciprocating movement in the direction of the double arrow P as the cross arm portions 36a, 36b slid to and fro within the guide slots 37, 38 respectively.

The reciprocating movement of the piston rod 31 moves the piston 32 connected thereto into an upper position during the upstroke adjacent the upper end 41a of the cylinder 41 of the cylinder-piston assembly 33 and a lower position during the downstroke of the piston 32 adjacent the bottom end 41b of the cylinder 41 within the cylinder bore 41c.

Figure 3:
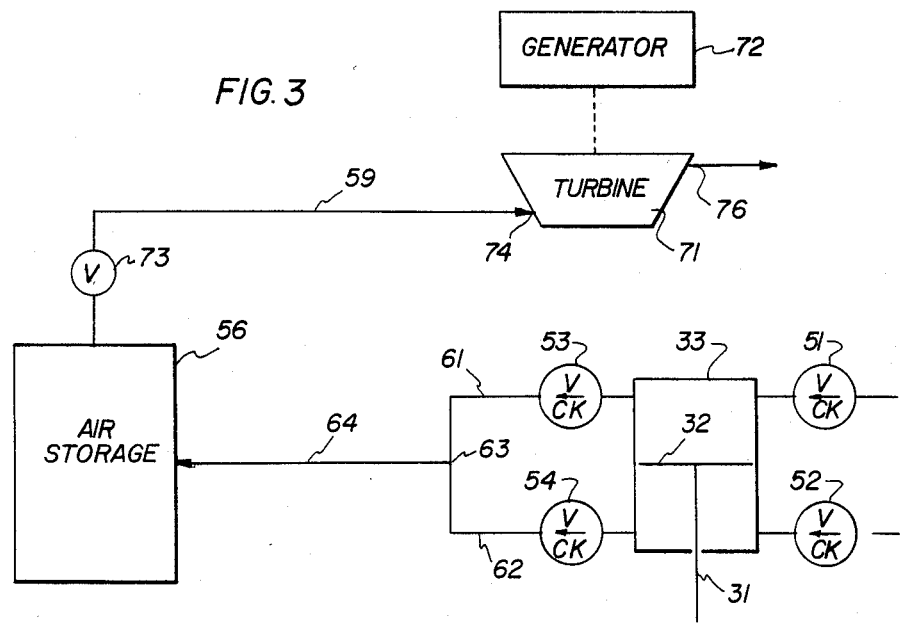
FIG. 3 is a schematic illustration of a power generating system incorporating the power generating apparatus of FIG. 1.

The upper portion 41a and the lower portion 41b of the cylinder 41 is provided with inlet and outlet openings 46, 48, and 47,49 respectively which are provided with check valve means as shown schematically in FIG. 3. In FIG. 3, check valves 53, 54 are disposed within the outlet openings 47, 49 respectively. As can be understood, the check valves 51, 52 permit the entry of atmospheric air as indicated by the arrows A in FIG. 1 while blocking the flow of air outwardly from the inlet openings 46, 48. The check valves 53, 54 in the outlet openings 47, 49 permit the discharge of compressed air outwardly from the cylinder 41 as indicated by the arrows C while preventing the flow of compressed air in the opposite directions into the cylinder 41.

The apparatus of FIG. 1 also includes a storage reservoir 56 for compressed air having an inlet 57 and an outlet 58 to which a conduit 59 is connected for conducting compressed air stored in the reservoir 56 to a point of use as will be explained hereinafter. Conduit means are provided for communicating the outlet openings 47, 49 in the cylinder 41 with the storage reservoir 56. More specifically, conduits 61, 62 are connected to the outlet openings 47, 49 respectively in the cylinder 41 with the other ends of the conduits connected by means of a T-fitting 63 to a conduit 64 communicating with the reservoir inlet 57. Thus, compressed air discharged from the outlet openings 47, 49 is conducted alternately through conduits 61, 62 to the common conduit 64 for storage in the reservoir 56.

In the operation of the apparatus FIG. 1, the wave motion which causes the buoyant member 12 to move between the dotted line and solid line position pivoting on the support arms 16, 17 in a reciprocating manner as indicated by the double arrow I, the piston rod 31 is moved vertically down-ward from the dotted line position of FIG. 1 as the buoyant member 12 moves from the solid line to the broken line positions due to the wave motion of the body of water W. As the piston 32 is moved downward, atmospheric air is drawn into the inlet opening 46 in the direction of the arrow A and air within the cylinder bore 40C below the piston is compressed and discharged through the outlet opening 49, the check valves 52 and 53, closing inlet opening 48, and outlet opening 47 respectively so that compressed air flows from the outlet opening 49 through conduits 62, 64 into the storage reservoir 56 during the downstroke of the piston 32. As the piston 32 is then moved upwardly resulting from the movement of the buoyant member 12 from the broken line to the solid line position of FIG. 12 the piston compressed the air in the cylinder bore 41c above the piston drawing in atmospheric air through inlet opening 48 and discharging compressed air from outlet opening 47 through conduit 61, 64 for storage in the reservoir 56. The check valves 51, 54 during the upstroke of the piston 32 close off inlet opening 46 and outlet opening 49 respectively, the piston rod 31 being maintained in a substantially vertical position during both the upstroke and downstroke of the piston 32 as a result of the lost motion coupling 13.

As indicated above, the compressed air stored in the reservoir 56 may be used for generating power such as the pumping of water for use in a steam generator, driving a hydraulic turbine or the like. In FIG. 3, the power generating apparatus of the invention is utilized together with a gas operated turbine shown schematically and designated by the reference numeral 71. The shaft of the gas operated turbine 71 may be drivably connected in any suitable manner to an electric generator 72 of any conventional type for the generation of electric power. As shown in FIG. 3, the compressed air from the reservoir 56 is conducted through a valve 73 through conduit 59 to the input 74 of turbine 71 provided with a discharge outlet 76.

Figure 5:
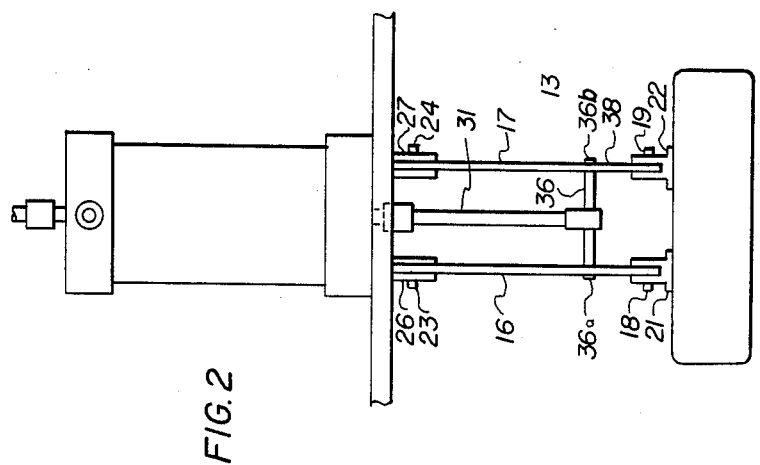
FIG. 5 is a schematic illustration of a portion of the embodiment of the power generating apparatus of the invention shown in FIG. 4.
Figure 4:
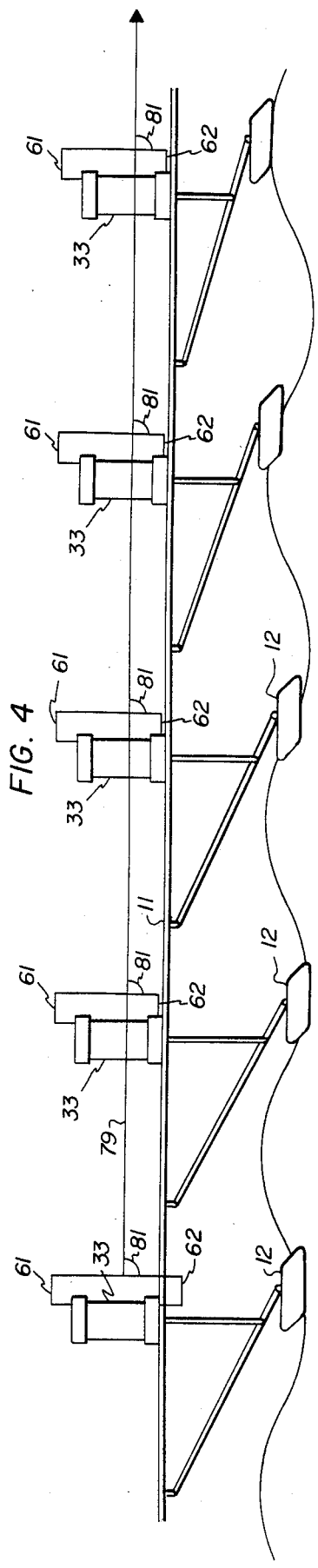
FIG. 4 is a view similar to FIG. 1 of another embodiment of the power generating apparatus of the invention.

Referring now to FIGS. 4 and 5, there is shown another embodiment of the invention wherein a plurality of power generating apparatuses of the type shown in FIG. 1 are arranged in tandem for increasing the power producing capacity of a single apparatus. Like numerals have been used to identify like parts in FIGS. 4, 5. In the embodiment of FIG. 4, 5, a plurality of buoyant members 12 are provided each pivotally connected as in the apparatus of FIG. 1 to the underside of the platform 11 and each is associated with one of a plurality of cylinder-piston assemblies 33. The outlet openings 47, 49 are connected to conduits 61, 62 respectively and rather than two check valves 53, 54 as in the embodiment of FIG. 1 only a single check valve 78 is provided as shown in FIG. 5. The outlet conduit 61, 62 of each of the cylinders 33 are arranged to be connected to a common conduit 79 extending throughout the plurality of cylinder-piston assemblies 33 as viewed in FIG. 4 by means of short tubular section 81. As has been explained with respect to the embodiment of FIG. 1, the common conduit 79 is connected to a compressed air storage reservoir 56 having an outlet 58 to which conduit 59 is connected for conducting compressed air from the reservoir 56 to the point of use.

Having thus described the preferred embodiment of the invention it should be understood that numerous structural modifications and adaptations may be re- sorted to without departing from the spirit of the invention.

What is claimed is:

1. A power generating apparatus comprising in combination, a stationary platform having an opening and supported over a body of water having a surface wave motion, at least one buoyant member floatingly supported on the surface of said body of water, a support member pivotally mounted at one end of the underside of said platform and connected at its other end to said buoyant member, a cylinder-piston assembly fixed in a stationary position on the upper side of said platform, said cylinder-piston assembly including a piston rod connected at its upper end to said piston and extending vertically downward through said cylinder and said opening in said platform, means for connecting the lower end of said piston rod to said support member intermediate the ends of said support member for vertical reciprocating movement of said piston and rod within said cylinder and for maintaining the axis of said rod in a vertically extending position during the pivotal movement of said buoyant member by said surface wave motion, inlet openings for atmospheric air adjacent the top and bottom of said cylinder, check valve means associated with each of said inlet and outlet opening, a compressed air storage reservoir, conduit means for communicating said outlet openings in said cylinder with said storage reservoir, said check valve means being arranged to admit atmospheric air into the lower portion of said cylinder and to discharge compressed air from the upper portion of said cylinder during the upward stroke of said piston and to admit atmospheric air into the upper portion of said cylinder to discharge compressed air from the lower portion of said cylinder during the downstroke of said piston during the rise and fall respectively of said buoyant member resulting from said wave motion, wherein said means for connecting the lower end of said piston rod to said support member comprises a lost motion coupling for maintaining the axis of said piston rod substantially vertical during said reciprocating movement and wherein said support member comprises a pair of arms arranged in spaced-apart parallel relationship and including a pair of spaced-apart bracket on the underside of said platform, a pin for pivotally connecting one end of each of said support arms to said platform brackets, a pair of spaced-apart brackets on said buoyant member, a pin for pivotally connecting the other end of each of said support arms to said buoyant member and wherein said means for connecting the lower end of said piston rod to said support member comprises a cross arm connected to the lower end of said piston rod and wherein the ends of said cross arm are connected to a respective one of said support arms by said lost motion coupling whereby motion of said buoyant member over a wide range is effected.

2. A power generating apparatus in accordance with claim 1 wherein said storage reservoir is provided with an outlet and including compressed air operated power generating means communicating with said storage reservoir outlet.

3. A power generating apparatus in accordance with claim 2 wherein said compressed air operated power generating means comprises a gas operated turbine and an electric generator drivably connected to said turbine.

4. A power generating apparatus in accordance with claim 1 including a plurality of said buoyant members each connected by one of said pivotally mounted support members to the underside of said stationary platform in spaced-apart relationship, a plurality of cylinder-piston assemblies each having a piston rod connected to a respective one of said buoyant members and wherein said conduit means include a conduit for interconnecting the outlet openings in all of said cylinder to said storage reservoir inlet.

5. A power generating apparatus in accordance with claim 1 wherein said lost motion coupling comprises a longitudinally extending slot in each of said support arms intermediate the ends of said support arms and a pin on each end of said cross arm slidably movable within a respective slot.

* * * * *